United States Patent
Guo et al.

(10) Patent No.: US 12,077,182 B2
(45) Date of Patent: Sep. 3, 2024

(54) LONGITUDINAL AND LATERAL INTEGRATED MOVING HORIZON DECISION MAKING METHOD AND APPARATUS FOR AUTONOMOUS VEHICLE IN SNOWY AND ICY ENVIRONMENT BASED ON TRAJECTORY PREDICTION

(71) Applicant: Jilin University, Jilin (CN)

(72) Inventors: Hongyan Guo, Jilin (CN); Qikun Dai, Jilin (CN); Jun Liu, Jilin (CN); Fang Xu, Jilin (CN)

(73) Assignee: Jilin University, Jilin (CN)

( * ) Notice: Subject to any disclaimer, the term of this patent is extended or adjusted under 35 U.S.C. 154(b) by 262 days.

(21) Appl. No.: 17/553,907

(22) Filed: Dec. 17, 2021

(65) Prior Publication Data

US 2022/0324482 A1    Oct. 13, 2022

(30) Foreign Application Priority Data

Mar. 31, 2021 (CN) .......................... 202110345664.1

(51) Int. Cl.
*B60W 60/00* (2020.01)
*B60W 30/095* (2012.01)
(Continued)

(52) U.S. Cl.
CPC ...... *B60W 60/0011* (2020.02); *B60W 30/095* (2013.01); *B60W 30/143* (2013.01);
(Continued)

(58) Field of Classification Search
CPC .......... B60W 60/0011; B60W 30/095; B60W 30/143; B60W 30/18163; B60W 40/02;
(Continued)

(56) References Cited

U.S. PATENT DOCUMENTS

| | | | |
|---|---|---|---|
| 2012/0053805 A1* | 3/2012 | Dantu | B60W 40/09 701/70 |
| 2015/0142207 A1* | 5/2015 | Flehmig | B60W 30/18163 701/1 |

(Continued)

FOREIGN PATENT DOCUMENTS

| | | | | |
|---|---|---|---|---|
| CN | 110377039 A | * | 10/2019 | ........... G05D 1/0223 |
| CN | 111923910 A | | 11/2020 | |

OTHER PUBLICATIONS

Machine Translation of CN-110377039-A retrieved from Search on Sep. 19, 2023 (Year: 09/1) (Year: 09/1) (Year: 09/1).*

(Continued)

*Primary Examiner* — Fadey S. Jabr
*Assistant Examiner* — Faris Asim Shaikh
(74) *Attorney, Agent, or Firm* — Reising Ethington P.C.

(57) ABSTRACT

Provided are a longitudinal and lateral integrated moving horizon decision making method and apparatus for an autonomous vehicle in a snowy and icy environment based on trajectory prediction, with an aim of reducing the complexity of planning a lane-changing trajectory. The method includes: screening out at least one obstacle, planning a lane-changing trajectory according to the at least one obstacle, establishing a decision making model according to the lane-changing trajectory, and controlling the autonomous vehicle by designing a longitudinal and lateral integrated moving horizon decision making controller according to the decision making model. Further provided are a longitudinal and lateral integrated moving horizon decision making apparatus for an autonomous vehicle in a snowy and icy environment based on trajectory prediction and a storage medium.

10 Claims, 2 Drawing Sheets

(51) Int. Cl.
*B60W 30/14* (2006.01)
*B60W 30/18* (2012.01)
*B60W 40/02* (2006.01)
*B60W 40/105* (2012.01)
*G06V 20/58* (2022.01)

(52) U.S. Cl.
CPC ...... *B60W 30/18163* (2013.01); *B60W 40/02* (2013.01); *B60W 40/105* (2013.01); *G06V 20/58* (2022.01); *B60W 2554/801* (2020.02); *B60W 2554/802* (2020.02); *B60W 2555/20* (2020.02)

(58) Field of Classification Search
CPC ......... B60W 40/105; B60W 2554/801; B60W 2554/802; B60W 2555/20; B60W 30/09; B60W 2554/804; B60W 60/001; B60W 50/00; B60W 2050/0034; B60W 2552/50; B60W 2754/30; B60W 10/20; B60W 2554/80; B60W 30/0956; B60W 2520/105; B60W 2754/20; B60W 50/0097; B60W 2754/50; B60W 2050/0028; B60W 2554/4045; B60W 30/16; B60T 2201/02; B60T 2201/022; G06V 20/58; G06V 20/588; G06V 20/64; G01C 21/3602; G08G 1/167; G05D 1/0221; G05D 1/0223; G05D 1/0257; G05D 2201/02

See application file for complete search history.

(56) References Cited

U.S. PATENT DOCUMENTS

| | | | |
|---|---|---|---|
| 2017/0008519 A1* | 1/2017 | Vijayan | B60W 30/0956 |
| 2018/0253975 A1* | 9/2018 | Mizutani | G08G 1/167 |
| 2018/0354519 A1* | 12/2018 | Miyata | B60W 10/20 |
| 2019/0088138 A1* | 3/2019 | Kang | B60W 30/09 |
| 2019/0337507 A1* | 11/2019 | Stein | B60W 50/0097 |
| 2019/0382019 A1* | 12/2019 | Abe | B60W 30/143 |
| 2019/0391580 A1* | 12/2019 | Di Cairano | G06N 5/022 |
| 2020/0269839 A1* | 8/2020 | Sato | B60W 60/0059 |
| 2020/0406969 A1* | 12/2020 | Ersal | B60W 10/184 |
| 2021/0078603 A1* | 3/2021 | Nakhaei Sarvedani | B60W 30/18163 |
| 2021/0197822 A1* | 7/2021 | Jhang | B60W 30/0953 |
| 2021/0240197 A1* | 8/2021 | Shalev-Shwartz | B60W 60/0016 |
| 2021/0253128 A1* | 8/2021 | Nister | G06N 7/01 |
| 2021/0362720 A1* | 11/2021 | Takahashi | B62D 6/003 |
| 2022/0105961 A1* | 4/2022 | Wang | G08G 1/164 |
| 2022/0371594 A1* | 11/2022 | Raffone | B60W 60/0011 |

OTHER PUBLICATIONS

Machine Translation of CN-110377039-A retrieved from Search on Sep. 19, 2023 (Year: 2023).*

Chinese Office Action corresponding to Chinese Application No. 202110345664.1, dated Mar. 29, 2022, 5 pages.

* cited by examiner

LONGITUDINAL AND LATERAL INTEGRATED MOVING HORIZON DECISION MAKING METHOD AND APPARATUS FOR AUTONOMOUS VEHICLE IN SNOWY AND ICY ENVIRONMENT BASED ON TRAJECTORY PREDICTION

CROSS-REFERENCE TO RELATED APPLICATION(S)

This application claims priority to Chinese Patent Application No. 202110345664.1, filed Mar. 31, 2021, the disclosures of which is incorporated herein by reference in entirety.

TECHNICAL FIELD

The present disclosure relates to the technical field of the autonomous driving and, in particular, to a longitudinal and lateral integrated moving horizon decision making method and a longitudinal and lateral integrated moving horizon decision making apparatus for an autonomous vehicle in a snowy and icy environment based on trajectory prediction and a storage medium.

BACKGROUND

In a snowy and icy environment, the related unmanned-driving is generally divided into four parts including perception, decision making, planning, and control. Among the four parts, decision making and planning are two critical issues for the unmanned-driving. The function of the decision making is to decide an action of the autonomous vehicle including lane changing, acceleration, and deceleration according to information of the obstacle obtained by the sensing part of the autonomous vehicle. The function of planning is to plan a trajectory executable by the control of the autonomous vehicle according to the result of the decision making. The trajectory is the autonomous vehicle position against time. However, the current trajectory planning method are of high complexity and is not suitable for coordination with decision-making.

SUMMARY

In response to the preceding technical problems, embodiments of the present disclosure provide a longitudinal and lateral integrated moving horizon decision making method and a longitudinal and lateral integrated moving horizon decision making method apparatus for an autonomous vehicle in a snowy and icy environment based on trajectory prediction and a storage medium with an aim of reducing the complexity of planning a lane-changing trajectory.

In a first aspect, embodiments of the present disclosure provide a longitudinal and lateral integrated moving horizon decision making method for an autonomous vehicle in a snowy and icy environment based on trajectory prediction. The method includes the steps below.

At least one obstacle is selected out.

A lane-changing trajectory is planned according to the surrounding obstacles selected out.

A decision making model is established according to the lane-changing trajectory.

A longitudinal and lateral integrated moving horizon decision making controller is designed according to the decision making model.

The step in which the obstacle is screened out includes a step below.

Information of the at least one obstacle is obtained through one or a combination of the following devices: a camera mounted on the autonomous vehicle, a radar mounted on the autonomous vehicle, and a map mounted on the autonomous vehicle.

Information of the at least one obstacle includes at least one of an obstacle $O(n,p)$ in the front direction and an obstacle $O(n,p)$ in the rear direction on each lane of the $n_l$ lanes in a same direction as a heading direction of the autonomous vehicle.

The $O(n,p)$ includes a longitudinal distance $D(n,p)$, a relative velocity $V(n,p)$, and an absolute acceleration $a(n,p)$ in the lane direction.

n denotes a lane identifier (ID) and is an integer from 1 to $n_l$.

p denotes a relative position of the obstacle and is equal to f or r. f denotes an obstacle in the front direction, and r denotes an obstacle in the rear direction.

$n_l$ denotes the number of lanes.

The step in which at least one obstacle is screened out includes a step below.

A closest obstacle in the front direction and a closest obstacle in the rear direction are screened out according to the equations below:

$$N(n, f) = \min_j D(j) \quad 1_j = n, D(j) \geq 0;$$

$$N(n, r) = \max_j D(j) \quad 1_j = n, D(j) < 0.$$

In the equations, j denotes an obstacle ID. D(j) denotes a longitudinal distance of the obstacle. N denotes an obstacle ID of a screened-out obstacle. $1_j$ denotes a lane ID of the lane to which the obstacle belongs.

Further, the lane ID $1_j$ of the lane to which the obstacle belongs is determined according to the equation below:

$$l_n = \begin{cases} n & f_{nll}(X(n, p)) \leq Y(n, p) < f_{nll+1}(X(n, p)) \\ \text{other} & \text{other} \end{cases}.$$

In the equation,

X(n,p) denotes a longitudinal distance of an obstacle.

Y(n,p) denotes a lateral distance of an obstacle.

$f_{nll}(X(n,p))$ denotes a lateral position of the lane line at a position with a longitudinal distance of X(n,p).

$n_u$ denotes the lane ID of the left lane line to an obstacle. $n_u$ ranges from 1 to $n_l$ in an ascending order from left to right.

In the method provided in the present disclosure, the step in which the lane-changing trajectory is planned according to the at least one obstacle includes a step below.

The lateral reference trajectory during that the autonomous vehicle is changing a lane is determined according to the equation below:

$$Y(t) = \int_0^t v(t) dt.$$

In the equation, Y(t) denotes the displacement, v(t) denotes the velocity, t denotes time.

And in the equation, v(t) is determined according to the equation below:

$$v(t) = \int_0^t a(t) dt.$$

In the equation, a(t) denotes a function of an acceleration of the autonomous vehicle against time.

The function a(t) of the acceleration of the autonomous vehicle against time is determined according to the equation below:

$$a(t) = \begin{cases} J_{max}t & 0 \leq t < t_1 \\ a_{max} & t_1 \leq t < t_2 \\ -a_{max}\dfrac{t-t_2}{t_3-t_2} + a_{max} & t_2 \leq t < t_3 \\ -a_{max}\dfrac{t-t_3}{t_4-t_3} & t_3 \leq t < t_4 \\ -a_{max} & t_4 \leq t < t_5 \\ a_{max}\dfrac{t-t_5}{t_6-t_5} - a_{max} & t_5 \leq t < t_6 \end{cases}.$$

In the equation, $J_{max}$ denotes the acceleration rate, $a_{max}$ denotes the maximum lateral acceleration; $t_1$ denotes a positive rise time of a(t), $t_2$ denotes a positive hold time of a(t), $t_3$ denotes a positive fall time of a(t), $t_4$ denotes a negative fall time of a(t), $t_5$ denotes a negative hold time of a(t), and $t_6$ denotes a negative rise time of a(t).

The positive rise refers to that the acceleration is larger than 0 and increased. The positive hold refers to that the acceleration is larger than 0 and remains unchanged. The positive fall refers to that the acceleration is larger than 0 and decreased. The negative fall refers to that the acceleration is smaller than 0 and decreased. The negative hold refers to that the acceleration is smaller than 0 and remains unchanged. The negative rise refers to that the acceleration is smaller than 0 and increased.

$t_1$, $t_2$, $t_3$, $t_4$, $t_5$, and $t_6$ are determined according to the equations below:

$$\begin{cases} t_1 = \dfrac{1}{1+k_l}\dfrac{t_l}{2} \\ t_2 = \dfrac{k_l}{1+k_l}\dfrac{t_l}{2} \\ t_3 = t_1 + t_2 \\ t_4 = 2t_1 + t_2 \\ t_5 = t_1 + 2t_2 \\ t_6 = 2t_1 + 2t_2 \end{cases}.$$

In the equations, $t_l$ denotes lane-changing time, where $k_l = t_2 : t_1$.

$t_1$ and $t_2$ are determined according to the equations below:

$$\begin{cases} t_1 = \dfrac{a_{max}}{J_{max}} \\ t_2 = -\dfrac{t_1}{2} + \dfrac{1}{2}\sqrt{t_1^2 + \dfrac{4d}{t_1 J_{max}}} \end{cases}.$$

In the equations, d denotes a lane width.
In the equations, $a_{max}$ and $J_{max}$ are determined according to the equations below:

$$\begin{cases} a_{max} = \dfrac{4d(1+k_l)}{t_l^2 k_l} \\ J_{max} = \dfrac{8d(1+k_l)^2}{t_l^3 k_l} \end{cases}.$$

In the method provided in the present disclosure, the step in which the decision making model is established according to the lane-changing trajectory includes a step below.

The decision making model is determined by taking the lane position l of the autonomous vehicle and the longitudinal displacement s of the autonomous vehicle as a system state and a system output and by taking a lane-changing time T, a longitudinal velocity $v_x$, and a lane ID lc of a selected lane as input.

The decision making model satisfies that:

$$\begin{cases} \dot{x} = A_c x + B_c u \\ y = C_c x \end{cases}.$$

In the model, $$A_c = \begin{bmatrix} 0 & 0 \\ 0 & -\dfrac{1}{T} \end{bmatrix}, B_c = \begin{bmatrix} 1 & 0 \\ 0 & 1 \end{bmatrix}, C_c = \begin{bmatrix} 1 & 0 \\ 0 & \dfrac{1}{T} \end{bmatrix}, x = \begin{bmatrix} s \\ l \end{bmatrix}, u = \begin{bmatrix} v_x \\ lc \end{bmatrix},$$

and y denotes the system output.

The lane position l is determined according to the number $n_{ll}$ of the lane line left to the autonomous vehicle, the lateral displacement $y_l$ from the autonomous vehicle to the lane line left to the host autonomous vehicle, and a lane width d.

The lane position l is determined according to the equation below:

$$l = n_{ll} + \dfrac{y_l}{d} - \dfrac{1}{2}.$$

In the method provided in the present disclosure, the step in which the autonomous vehicle is controlled to change the lane according to the decision making model includes the steps below.

The decision making model is discretized.

A prediction equation is derived.

A decision making objective function is constructed according to a collision avoidance objective function, a maintaining desired velocity objective function, an objective function for reducing lane changes, and an objective function for reducing the lane changing action changes.

An optimal decision making is determined according to the prediction equation and the optimization problem.

The autonomous vehicle is controlled according to the optimal decision making.

The optimal decision making includes the optimal velocity, the optimal lane ID, and the optimal lane-changing time.

The discretized decision making model satisfies that:

$$\begin{cases} x(k+1) = Ax(k) + Bu(k) \\ y(k) = Cx(k) \end{cases},$$

$A = e^{A_c T_s}$, $B = \int_0^{T_s} e^{A_c T_s} dt B_c$, $C = C_c$, and $T_s$ denotes discrete time.

$$C_c = \begin{bmatrix} 1 & 0 \\ 0 & \dfrac{1}{T} \end{bmatrix},$$

and T denotes lane-changing time.

The prediction equation satisfies that:

$$\begin{cases} y(k+1) = CAx(k) + CBu(k) \\ \vdots \\ y(k+N) = CA^N x(k) + CA^{N-1} Bu(k) + \ldots + CBu(k+N-1) \\ \vdots \\ y(k+P) = CA^P x(k) + CA^{P-1} Bu(k) + \ldots + \sum_{i=1}^{P-N+1} CA^{i-1} Bu(k+N-1) \end{cases}$$

In the equation, P denotes a prediction horizon. N denotes a control horizon.

The collision avoidance objective function satisfies that:

$$J_1 = \sum_{i=1}^{P} \|TTC_f\|^2 + \|TTC_r\|^2.$$

In the function, $TTC_f$ denotes the time-to-collision (TTC) between the autonomous vehicle and the closest obstacle in the front direction, and $TTC_r$ denotes the TTC between the autonomous vehicle and the closest obstacle in the rear direction.

The autonomous vehicle maintains the desired velocity, and the desired velocity is preset for $$J_2 = \sum_{i=1}^{N} \|\Delta v_x\|^2.$$

In which, $\Delta v_x = v_{ref} - v_x \cdot v_{ref}$ denotes the desired vehicle velocity. $v_x$ denotes the longitudinal velocity. N denotes the control horizon.

The objective for reducing lane changes is that:

$$J_3 = \sum_{i=1}^{N} \left\| \frac{lc}{T} \right\|^2.$$

lc denotes the lane ID of a selected lane. T denotes lane-changing time.

The objective for reducing the lane changing action changes is that:

$$J_4 = \sum_{i=1}^{N} \|\Delta lc\|^2.$$

In which, $\Delta lc = lc(i) - lc(i-1)$. lc denotes the lane ID of a selected lane. $\Delta lc$ denotes the lane changing action change.

The lane-changing trajectory planning method for an autonomous vehicle provided in this disclosure helps implement a smooth lane-changing trajectory planning with an adjustable time for lane changing completion, which enables the autonomous vehicle to execute a lane-changing decision making output by a longitudinal and lateral integrated moving horizon decision making method. The longitudinal and lateral integrated moving horizon decision making method for an autonomous vehicle provided in the present disclosure can decide a longitudinal velocity, a lane, and a lane-changing time, and implement decision making and trajectory planning for the autonomous vehicle, thereby reducing the complexity of planning a lane change.

In a second aspect, embodiments of the present disclosure provide a moving horizon decision making apparatus for an autonomous vehicle in a snowy and icy environment based on trajectory prediction. The apparatus includes an obstacle screening module, a planning module, a decision making module, and a control module.

The obstacle screening module is configured to screen out an obstacle.

The planning module is configured to plan a lane-changing trajectory according to the obstacle.

The decision making model establishing module is configured to establish a decision making model according to the lane-changing trajectory.

The control module is configured to control the autonomous vehicle according to the longitudinal and lateral integrated moving horizon decision making method.

BRIEF DESCRIPTION OF DRAWINGS

To illustrate solutions in embodiments of the present disclosure more clearly, the drawings used in the description of the embodiments are described hereinafter. Apparently, the drawings described hereinafter illustrate part of embodiments of the present disclosure, and those skilled in the art may obtain other drawings based on the drawings described hereinafter on the premise that no creative work is done.

DETAILED DESCRIPTION

Figure 1:
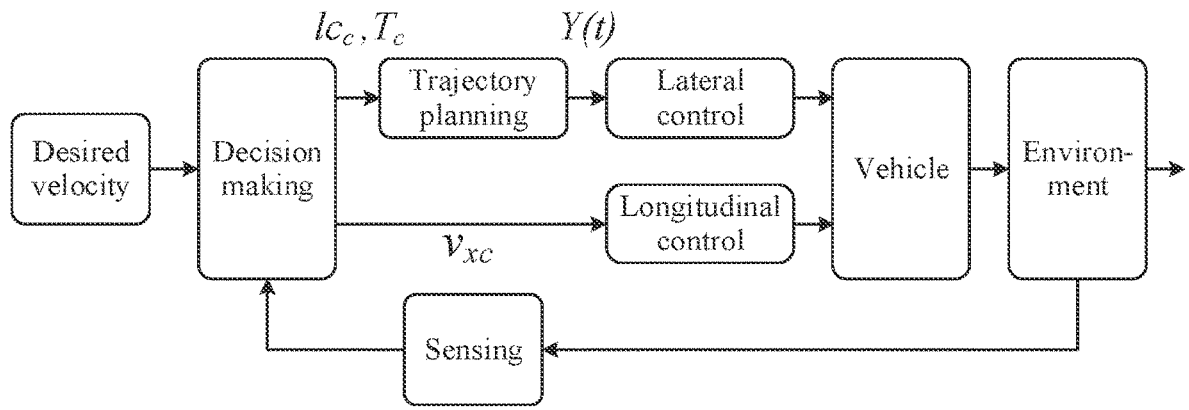
FIG. 1 is a diagram illustrating the control of an autonomous vehicle.

As shown in FIG. 1, FIG. 1 is a diagram illustrating the control of an autonomous vehicle. The autonomous vehicle senses the environmental information through a sensing device and inputs the sensed environmental information into a decision making module. According to the desired velocity and the sensed environmental information, the decision making module controls a longitudinal velocity and plans a lateral lane-changing trajectory. Moreover, according to a result of lane-changing trajectory planning, the decision making module controls the lateral movement and the longitudinal movement, thereby implementing the control of the lateral lane change.

It is to be noted that the order of the embodiments of the present disclosure only represents the sequence of the embodiments but does not represent the advantages or disadvantages of technical solutions provided in the embodiments.

Embodiment One

Figure 2:
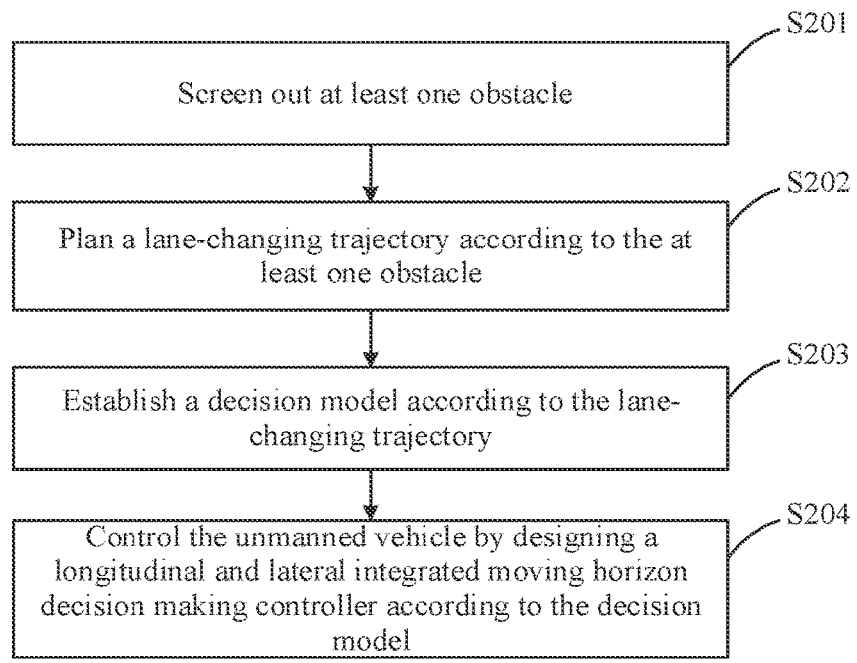
FIG. 2 is a diagram illustrating the lane changing decision making of an autonomous vehicle according to an embodiment of the present disclosure.

Referring to FIG. 2, FIG. 2 shows a diagram illustrating a longitudinal and lateral integrated moving horizon decision making method for an autonomous vehicle in a snowy and icy environment based on trajectory prediction according to embodiments of the present disclosure. As shown in FIG. 2, the method includes steps S201 to S204.

In step S201, at least one obstacle is screened out.

In step S202, a lane-changing trajectory is planned according to the at least one obstacle.

In step S203, a decision making model is established according to the lane-changing trajectory.

In step S204, the autonomous vehicle is controlled by designing a longitudinal and lateral integrated moving horizon decision making controller according to the decision making model.

In this embodiment, according to information of the at least one obstacle and information of lane line given by a sensor of the autonomous vehicle, obstacles in the front direction and/or in the rear direction are screened out, a longitudinal velocity, a lane, and a lane-changing time are decided, the lane-changing trajectory is calculated by the lane-changing trajectory planning, and at meanwhile, the longitudinal velocity is tracked by the longitudinal velocity tracking.

In the preceding step S201, as a preferred example, the information of road and at least one surrounding obstacle may be obtained based on a camera, a radar or a map mounted on the autonomous vehicle so as to screen out at least one obstacle O(n,p) in the front direction and/or in the rear direction in each of the $n_l$ lanes in a same direction as a heading direction of the host autonomous vehicle. The information of an obstacle O(n,p) includes the longitudinal distance D (n,p) in the lane direction, the relative velocity V(n,p), and the absolute acceleration a(n,p), in which, n denotes a lane ID of each line and is an integer ranged from 1 to $n_l$. The lane ID of a lane in the leftmost direction is 1 and the lane ID of the lane in the right direction increases successively from the left to the right. p denotes a relative position of the obstacle. p=f or r. f denotes an obstacle in the front direction. r denotes an obstacle in the rear direction. As a preferred example, a method for screening out may be: calculating a lane $l_n$ to which the obstacle belongs, according to a lane equation where y=$f_{nll}$(x), a longitudinal distance X(n,p) of the obstacle, and a lateral distance Y(n,p) of the obstacle, as expressed in the equation (1).

$$l_n = \begin{cases} n & f_{nll}(X(n, p)) \le Y(n, p) < f_{nll+1}(X(n, p)) \\ \text{other} & \text{other} \end{cases} \quad (1)$$

In the equation (1), $f_{nll}$(n,p)) denotes a lateral position of a lane line at a position with a longitudinal distance of X(n,p). Y(n,p) denotes a lateral distance of the obstacle. $n_u$ denotes a lane ID of a lane line left to the obstacle. $n_u$ ranges from 1 to $n_l$ in an ascending order from left to right.

In an embodiment, screened-out obstacles include an obstacle in the front direction and an obstacle in the rear direction, which may be expressed in the equation (2).

$$\begin{cases} N(n, f) = \min_j D(j) & l_j = n, D(j) \ge 0 \\ N(n, r) = \max_j D(j) & l_j = n, D(j) < 0 \end{cases} \quad (2)$$

In the equation (2), j denotes an obstacle ID, D(j) denotes the longitudinal distance of the obstacle, and N denotes the number of the screened-out obstacles.

As a preferred example, in the preceding step S202, the lane-changing trajectory may be planned by using a method for trapezoidal acceleration. Preferably, the trapezoidal acceleration a(t) is divided into six durations in time, which are a positive rise $t_1$, a positive hold $t_2$, a positive fall $t_3$, a negative fall $t_4$, a negative hold $t_5$, and a negative rise $t_6$ respectively.

It is to be noted that the positive rise refers to that the acceleration is larger than 0 and increased. The positive hold refers to that the acceleration is larger than 0 and remains unchanged. The positive fall refers to that the acceleration is larger than 0 and decreased. The negative fall refers to that the acceleration is smaller than 0 and decreased. The negative hold refers to that the acceleration is smaller than 0 and remains unchanged. The negative rise refers to that the acceleration is smaller than 0 and increased.

In an embodiment, the acceleration a(t) is expressed as the equation (3).

$$a(t) = \begin{cases} J_{max}t & 0 \le t < t_1 \\ a_{max} & t_1 \le t < t_2 \\ -a_{max}\dfrac{t - t_2}{t_3 - t_2} + a_{max} & t_2 \le t < t_3 \\ -a_{max}\dfrac{t - t_3}{t_4 - t_3} & t_3 \le t < t_4 \\ -a_{max} & t_4 \le t < t_5 \\ a_{max}\dfrac{t - t_5}{t_6 - t_5} - a_{max} & t_5 \le t < t_6 \end{cases} \quad (3)$$

In the equation (3), $J_{max}$ denotes an acceleration rate, $a_{max}$ denotes a maximum lateral acceleration, for the lane-changing time $t_l$, a ratio of a hold period to a rising period is that $k_l = t_2:t_1$, $k_1$ is an adjustable parameter. The time for each period is expressed as the equation (4).

$$\begin{cases} t_1 = \dfrac{1}{1 + k_l} \dfrac{t_l}{2} \\ t_2 = \dfrac{k_l}{1 + k_l} \dfrac{t_l}{2} \\ t_3 = t_1 + t_2 \\ t_4 = 2t_1 + t_2 \\ t_5 = t_1 + 2t_2 \\ t_6 = 2t_1 + 2t_2 \end{cases} \quad (4)$$

When the lane change of the autonomous vehicle is completed, the lateral displacement is a lane width d, as expressed in the following equation (5).

$$\begin{cases} t_1 = \dfrac{a_{max}}{J_{max}} \\ t_2 = -\dfrac{t_1}{2} + \dfrac{1}{2}\sqrt{t_1^2 + \dfrac{4d}{t_1 J_{max}}} \end{cases} \quad (5)$$

In the equation (5), the lane width d is in a unit of meters (m).

The Equation (6) is obtained according to the equations (4) and (5).

$$\begin{cases} a_{max} = \dfrac{4d(1 + k_l)}{t_l^2 k_l} \\ J_{max} = \dfrac{8d(1 + k_l)^2}{t_l^3 k_l} \end{cases} \quad (6)$$

The velocity curve v(t) may be obtained by integrating the acceleration in time, as expressed in the following equation (7).

$$v(t) = \int_0^t a(t)dt \quad (7)$$

The displacement curve y(t) is obtained by integrating the velocity curve v(t), that is, the displacement curve y(t) is a lateral reference trajectory during that the autonomous vehicle is changing the lane, as expressed in the equation (8).

$$y(t)=\int_0^t v(t)dt \quad (8)$$

In the equation (8), the displacement curve y(t) is in the geodetic coordinate system.

In an embodiment, in the preceding step S203, the decision making model established according to the lane-changing trajectory may be established as a longitudinal kinematic model, that is, as the equation (9).

$$\dot{s}=v_x \quad (9)$$

It is to be noted that s denotes the longitudinal displacement of the host autonomous vehicle in a unit of m; $v_x$, denotes the longitudinal velocity of the host autonomous vehicle in a unit of m/s.

In an embodiment, a one-order inertia element is used for replacing the model of the displacement curve y(t). The expression of the inertia element is expressed as the equation (10).

$$\dot{l} = \left[-\frac{1}{T}\right]l + lc \quad (10)$$

In the equation (10), lc denotes the lane ID of a selected lane and is an integer from 1 to $n_l$. T denotes lane-changing time. The adjusting time of the one-order inertia element satisfying $t_s=3T$. The lane-changing time $t_1$ is same as the lane-changing time $t_s$, that is, $t_1=3T$. l denotes the lane position of the host autonomous vehicle, representing the lateral lane position of the host autonomous vehicle. The calculation equation of l is expressed as equation (11).

$$l = n_{ll} + \frac{y_l}{d} - \frac{1}{2} \quad (11)$$

$y_l$ denotes the lateral displacement from the host autonomous vehicle to the lane line left to the host autonomous vehicle in a unit of m.

According to the equations (8) and (9), an integrated decision making model is obtained, that is, as expressed in the following equations (12).

$$\begin{cases} \begin{bmatrix} \dot{s} \\ \dot{l} \end{bmatrix} = \begin{bmatrix} 0 & 0 \\ 0 & -\frac{1}{T} \end{bmatrix} \begin{bmatrix} s \\ l \end{bmatrix} + \begin{bmatrix} 1 & 0 \\ 0 & 1 \end{bmatrix} \begin{bmatrix} v_x \\ lc \end{bmatrix} \\ y = \begin{bmatrix} 1 & 0 \\ 0 & \frac{1}{T} \end{bmatrix} \begin{bmatrix} s \\ l \end{bmatrix} \end{cases} \quad (12)$$

Assuming that $$A_c = \begin{bmatrix} 0 & 0 \\ 0 & -\frac{1}{T} \end{bmatrix}, B_c = \begin{bmatrix} 1 & 0 \\ 0 & 1 \end{bmatrix}, C_c = \begin{bmatrix} 1 & 0 \\ 0 & \frac{1}{T} \end{bmatrix}, x = \begin{bmatrix} s \\ l \end{bmatrix}, \text{ and } u = \begin{bmatrix} v_x \\ lc \end{bmatrix},$$

a state-space expression is obtained, as expressed in the equation (13). The meaning of longitudinal and lateral integrated moving horizon decision making method is that the lateral decision making of the autonomous vehicle and the longitudinal decision making of the autonomous vehicle are obtained by one controller. Compared with the independent lateral decision making and the independent longitudinal decision making, the longitudinal and lateral integrated moving horizon decision making method enhances the performance of the decision making system.

$$\begin{cases} \dot{x} = A_c x + B_c u \\ y = C_c x \end{cases} \quad (13)$$

In an embodiment, in the preceding step S204, in the embodiments of the present disclosure, as for controlling the autonomous vehicle to change the lane by designing a longitudinal and lateral integrated moving horizon decision making controller according to the decision making model, an optimal control variable is decided first; then the optimal control variable is applied to a corresponding device or module.

In an embodiment, the decision making for the optimal control variable may include the steps below.

In step A, the decision making model is discretized.

In step B, a prediction equation is derived.

In step C, a decision making objective function is constructed according to a collision avoidance objective function, a maintaining desired velocity objective function, an objective function for reducing lane changes, and an objective function for reducing lane changing action changes.

In step D, optimal control variables are determined according to the prediction equation and an optimization problem.

In step E, the autonomous vehicle is controlled according to the optimal control variables.

The optimal control variables include an optimal velocity, an optimal lane ID, and optimal lane-changing time.

In an embodiment, the equation (14) shows that the preceding decision making model (13) is discretized.

$$\begin{cases} x(k+1) = Ax(k) + Bu(k) \\ y(k) = Cx(k) \end{cases} \quad (14)$$

In the equations (14), $A=e^{A_c T_s}$, $B=\int_0^{T_s} e^{A_c T_s} dt B_c$, $C=C_c$, in which $T_s$ denotes discrete time in a unit of second (s).

The prediction equation (15) of the system may be derived from the equation (14).

$$\begin{cases} y(k+1) = CAx(k) + CBu(k) \\ \vdots \\ y(k+N) = CA^N x(k) + CA^{N-1} Bu(k) + \ldots + CBu(k+N-1) \\ \vdots \\ y(k+P) = CA^P x(k) + CA^{P-1} Bu(k) + \ldots + \\ \sum_{i=1}^{P-N+1} CA^{i-1} Bu(k+N-1) \end{cases} \quad (15)$$

In the equation (15), P denotes a prediction horizon. N denotes a control horizon. The meaning of trajectory prediction is that the longitudinal trajectory and the lateral trajectory are predicted based on the decision making model. The equation (15) may be expressed as the equation (16).

$$Y(k)=S_{yx}x(k)+S_{yu}U(k) \quad (16)$$

In the equation (16), $$S_{yx} = \begin{bmatrix} CA \\ CA^2 \\ \vdots \\ CA^P \end{bmatrix},$$

-continued $$S_{yu} = \begin{bmatrix} CB & 0 & 0 & \cdots & & 0 \\ CAB & CB & 0 & \cdots & & 0 \\ \vdots & \vdots & \vdots & \ddots & & \vdots \\ CA^{N-1}B & CA^{N-2}B & \cdots & \cdots & & CB \\ \vdots & \vdots & \vdots & \ddots & & \vdots \\ CA^{P-1}B & CA^{P-2}B & \cdots & \cdots & & \sum_{i=1}^{P-N+1} CA^i B \end{bmatrix},$$

$$Y(k) = \begin{bmatrix} y(k+1) \\ y(k+2) \\ \vdots \\ y(k+P) \end{bmatrix},$$

$$U(k) = \begin{bmatrix} u(k+1) \\ u(k+2) \\ \vdots \\ u(k+P) \end{bmatrix}.$$

In an embodiment, in the preceding step C, the collision avoidance objective function may be shown in the following equation (17).

$$J_1 = -\Sigma_{i=1}^{P} \|TTC_f\|^2 + \|TTC_r\|^2 \quad (17)$$

In the equation (17), $TTC_f$ denotes the time of collision between the host autonomous vehicle and a closest obstacle in the front direction, and $TTC_r$ denotes the time of collision between the host autonomous vehicle and a closest obstacle in the rear direction. The calculation equation of the collision time is expressed as equation (18).

$$\begin{cases} TTC_f = \begin{cases} T_l & D_k(n,f) \leq S_k \\ T_h & D_k(n,f) > S_k \text{ and } V_k(n,p) > 0 \\ \left|\dfrac{D_k(n,f) - S_k}{V_k(n,f)}\right| & \text{else} \end{cases} \\ TTC_r = \begin{cases} T_l & D_k(n,r) \geq -S_k \\ T_h & D_k(n,r) < -S_k \text{ and } V_k(n,p) < 0 \\ \left|\dfrac{D_k(n,r) - S_k}{V_k(n,r)}\right| & \text{else} \end{cases} \end{cases} \quad (18)$$

In the equation (18), $T_l$ denotes a low collision time, $T_h$ denotes high collision time, $T_l$ and $T_h$ each is a constant in a unit of s, and $D_k(n,p)$ denotes a relative distance at time k, which is expressed as:

$$D_k(n,p) = D(n,p) + (V(n,p) + v_{x0})kT_s + \tfrac{1}{2}a(n,p)(kT_s)^2 - \Sigma_{i=1}^{k} v_x(k)T_s,$$

in which, $v_{x0}$ denotes a current longitudinal velocity of the host autonomous vehicle in a unit of m/s, and $V_k(n,p)$ denotes a relative vehicle velocity at the time k, which is expressed as:

$$V_k(n,p) = V(n,p) + v_{x0} - v_x(k),$$

in which, $S_k$ denotes a safe distance satisfying: $S_k = T_{headway} v_x(k) + d_h$, $T_{headway}$ denotes a constant of headway time in a unit of s, and $d_h$ denotes a constant of vehicle-to-vehicle distance in a unit of m.

In this embodiment, the high collision time refers to a time at which two vehicles may collide after a long time when a distance between the two vehicles is longer than a safe distance and when a front vehicle is faster than the host autonomous vehicle or a rear vehicle is slower than the host autonomous vehicle. The low collision time indicates refers to a time at which two vehicles may collide in a short time when a distance between the two vehicles is shorter than the safe distance.

In an embodiment, in the preceding step C, the desired velocity maintained by the autonomous vehicle may be expressed in the following equation (19).

$$J_2 = \sum_{i=1}^{N} \|\Delta v_x\|^2 \quad (19)$$

In the equation (19), $\Delta v_x = v_{ref} - v_x(k)$, in which $v_{ref}$ denotes a desired vehicle velocity in a unit of m/s.

In an embodiment, in the preceding step C, the condition for reducing lane changes may be expressed in the following equation (20).

$$J_3 = \sum_{i=1}^{N} \left\|\dfrac{lc}{T}\right\|^2 \quad (20)$$

In an embodiment, in the preceding step C, the condition for reducing the lane changing action changes may be expressed in the following equation (21).

$$J_4 = \sum_{i=1}^{N} \|\Delta lc\|^2 \quad (21)$$

In the equation (21), $\Delta lc$ denotes the lane changing action change. $\Delta lc = lc(k) - lc(k-1)$ In embodiments of the present disclosure, the velocity of the host autonomous vehicle ranges from 0 to a speed limit of a road section, that is, as expressed in the equation (22).

$$0 \leq v_x(k) \leq v_{max} \quad (22)$$

In the equation (22), $v_{max}$ denotes the speed limit of the road section in a unit of m/s.

In embodiments of the present disclosure, considering that an excessively fast lane-changing time in a snowy and icy environment may cause the autonomous vehicle to enter an extreme working condition, a tire force limit needs to be considered as for the minimum lane-changing time, that is, as expressed in the equation (23).

$$a_{max} = \dfrac{4d(1+k_l)}{t_l^2 k_l} = \dfrac{4d(1+k_l)}{(3T)^2 k_l} \leq \dfrac{\sqrt{(mg\mu)^2 - F_x^2}}{m} \quad (23)$$

In the equation (23), m denotes a weight of a whole vehicle in a unit of kg, μ denotes a road adhesion coefficient, and $F_x$ denotes a current longitudinal tire force of the autonomous vehicle, in a unit of N.

In an embodiment, in the preceding step D, the optimal control variables may be determined according to the prediction equation and an optimization problem in the following manner.

Weight coefficients are introduced to handle demand conflicts of each optimization object to obtain optimal control variables, that is, to be converted into an optimization problem (24).

$$\min_{v_x, lc, T} J = \Gamma_1 J_1 + \Gamma_2 J_2 + \Gamma_3 J_3 + \Gamma_4 J_4 \quad (24)$$

-continued $1 \leq l_c \leq n_l$, $l_c$ being an integer $0 \leq v_x(k) \leq v_{max}$ s.t.: $\dfrac{4d(1+k_l)}{(3T)^2 k_l} \leq \dfrac{\sqrt{(mg\mu)^2 - F_x^2}}{m}$ In the equation (24), J denotes the objective function. $\Gamma_1$, $\Gamma_2$, $\Gamma_3$, and $\Gamma_4$ denote relative weight coefficients.

The obtained optimal control variables may be expressed as $v_x^*$, lc*, and T*, and the selected control variables satisfy that: $v_{cx} = v_x^*(1)$, $lc_c = lc^*(1)$, and $T_c = T^*(1)$.

In an embodiment, in the preceding step E, the autonomous vehicle is controlled to change a lane, according to an optimal lane-changing control variable. $v_{xc}$ is applied to the longitudinal velocity tracking controller. With the symbol of $lc_c$ taken, ld is obtained and is applied to the lane-changing trajectory planning, wherein ld=sgn($lc_c$) indicating changing the lane to the left or to the right, and $t_f = 3T_c$ are both applied to the lane-changing trajectory planning.

The method in this embodiment helps implement a smooth lane-changing trajectory planning with an adjustable time for lane-changing completion, which enables the autonomous vehicle to execute a lane-changing decision making by a longitudinal and lateral integrated moving horizon decision making controller of the autonomous vehicle designed according to the decision making model. This method can describe the autonomous vehicle decision making process and implement the design of the model prediction controller of the autonomous vehicle designed according to the decision making model. This method can decide a longitudinal velocity, a lane, and a lane-changing time, implement decision making and trajectory planning for the autonomous vehicle, and implement trajectory planning with an adjustable time for lane changing, thereby reducing the complexity of planning a lane-changing trajectory for the autonomous vehicle.

Embodiment Two

Figure 3:
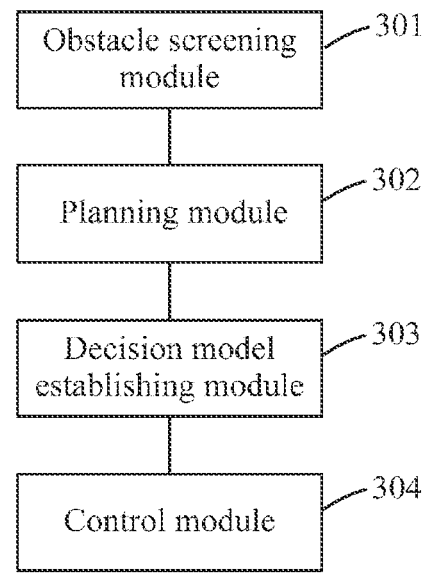
FIG. 3 is a diagram illustrating the decision making apparatus for an autonomous vehicle according to an embodiment of the present disclosure.

Based on a same inventive concept, embodiments of the present disclosure further provide a longitudinal and lateral integrated moving horizon decision making apparatus for an autonomous vehicle in a snowy and icy environment based on trajectory prediction. As shown in FIG. 3, the apparatus includes an obstacle screening module 301, a planning module 302, a decision making module establishing module 303, and a control module 304.

The obstacle screening module 301 is configured to screen out at least one obstacle.

The planning module 302 is configured to plan a lane-changing trajectory according to the at least one obstacle.

The decision making model establishing module 303 is configured to establish a decision making model according to the lane-changing trajectory.

The control module 304 is configured to control the autonomous vehicle by designing a longitudinal and lateral integrated moving horizon decision making controller according to the decision making model.

It is to be noted that the obstacle screening module 301 provided in this embodiment can implement all the functions included in step S201 in embodiment one, solving the same technical problems and achieving the same technical effects, which is not repeated herein.

Correspondingly, the planning module 302 provided in this embodiment can implement all the functions included in step S202 in embodiment one, solving the same technical problems and achieving the same technical effects, which is not repeated herein.

Correspondingly, the decision making model establishing module 303 provided in this embodiment can implement all the functions included in step S203 in embodiment one, solving the same technical problems and achieving the same technical effects, which is not repeated herein.

Correspondingly, the control module 304 provided in this embodiment can implement all the functions included in step S204 in embodiment one, solving the same technical problems and achieving the same technical effects, which is not repeated herein.

It is to be noted that the apparatus provided in embodiment two and the method provided in embodiment one belong to the same inventive concept, solve the same technical problems, and achieve the same technical effects. The apparatus provided in embodiment two can implement all the methods in embodiment one. The similarities are not repeated.

Embodiment Three

Figure 4:
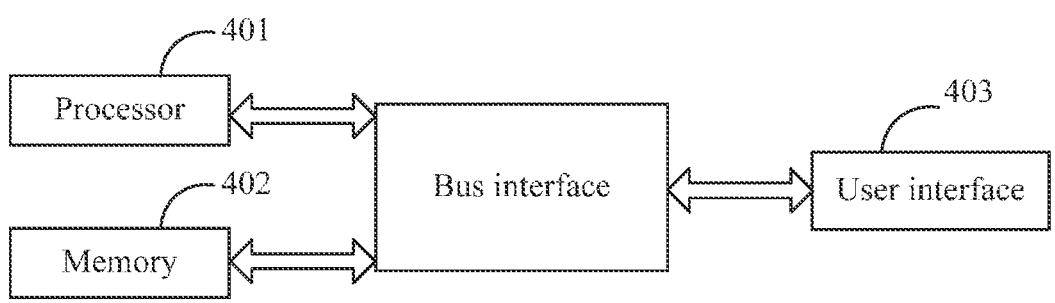
FIG. 4 is a diagram illustrating another decision making apparatus for an autonomous vehicle according to an embodiment of the present disclosure.

Based on the same inventive concept, embodiments of the present disclosure further provide a longitudinal and lateral integrated moving horizon decision making apparatus for an autonomous vehicle in a snowy and icy environment based on trajectory prediction. As shown in FIG. 4, the apparatus includes a memory 402, a processor 401, and a user interface 403.

The memory 402 is configured to store a computer program.

The user interface 403 is configured to interact with a user.

The processor 401 is configured to read the computer program in the memory 402, and execute the computer program to implement: screening out at least one obstacle; planning a lane-changing trajectory according to the at least one obstacle; establishing a decision making model according to the lane-changing trajectory; and controlling the autonomous vehicle by designing a longitudinal and lateral integrated moving horizon decision making controller according to the decision making model.

In FIG. 4, the bus architecture may include any number of buses and any number of bridges interconnected. Specifically, various circuits including one or more processors represented by the processor 401 and a memory represented by the memory 402 are connected together. The bus architecture may also connect various other circuits together, for example, peripheral devices, voltage regulators, power management circuits, which is well known in the art and thus is not described herein. The processor 401 is configured to be in charge of managing the bus architecture and general processing. The memory 402 may be configured to store data used during the processor 401 performing an operation.

The processor 401 may be a CPU, an ASIC, an FPGA, or a CPLD. The processor 401 may also employ a multi-core architecture.

When the processor 401 executes the computer program stored in the memory 402, any one of the longitudinal and lateral integrated moving horizon decision making methods of an autonomous vehicle in a snowy and icy environment based on trajectory prediction in embodiment one is implemented.

It is to be noted that the apparatus provided in embodiment three and the method provided in embodiment one belong to the same inventive concept, solve the same technical problems, and achieving the same technical effects. The apparatus provided in embodiment three can implement all the methods in embodiment one. The similarities are not repeated.

The present disclosure further provides a processor-readable storage medium. The processor-readable storage medium stores the computer program. When the processor executes the computer program, any one of the longitudinal and lateral integrated moving horizon decision making methods of an autonomous vehicle in a snowy and icy environment based on trajectory prediction in embodiment one is implemented.

It is to be noted that the division of units in embodiments of the present disclosure is exemplary and is merely a division in logical functions. Other division modes may exist in an actual implementation. Additionally, each functional unit in each embodiment of the present disclosure may be integrated into one processing unit. Alternatively, each unit may be physically independent. Alternatively, two or more units may be integrated into one unit. The integrated unit may be implemented in hardware or in a software functional unit.

It is to be understood by those skilled in the art that embodiments of the present disclosure may be provided as methods, systems, or computer program products. Therefore, the present disclosure may be implemented in a form of hardware completely, in a form of software completely, or in a form of hardware combined with software. Moreover, the present disclosure may be implemented in a form of a computer program product executed on one or more computer-readable storage media (including, but not limited to, a disk memory and an optical memory) that includes computer-readable program codes.

The present disclosure is described with reference to flowcharts and/or block diagrams of methods, devices (systems) and computer program products according to embodiments of the present disclosure. It is to be understood that computer program instructions implement each flow and/or block in the flowcharts and/or block diagrams and a combination of flows and/or blocks in the flowcharts and/or block diagrams. These computer program instructions can be provided to a general-purpose computer, a special-purpose computer, an embedded processor or a processor of other programmable data processing equipment to produce a machine so that instructions executed by a computer or the processor of other programmable data processing equipment produce a means for implementing functions specified in one or more flows in the flowcharts and/or one or more blocks in the block diagrams.

These computer program instructions can also be stored in a computer-readable memory which can direct the computer or other programmable data processing equipment to operate in a particular manner so that the instructions stored in the computer-readable memory produce a manufactured product including an instruction means. The instruction means implements the functions specified in one or more flows in the flowcharts and/or one or more blocks in the block diagrams.

It is apparent to those skilled in the art that various modifications and variations can be made in the present disclosure without departing from the spirit and scope of the application. In this case, if such modifications and variations are within the claims of the present disclosure and equivalent technologies thereof, the present disclosure is intended to include such modifications and variations.

What is claimed is:

1. A longitudinal and lateral integrated moving horizon decision making method for an autonomous vehicle in a snowy and icy environment based on trajectory prediction, comprising:

screening out at least one obstacle;

planning a lane-changing trajectory according to the at least one obstacle;

establishing a decision making model according to the lane-changing trajectory; and controlling the autonomous vehicle by designing a longitudinal and lateral integrated moving horizon decision making controller according to the decision making model;

wherein establishing the decision making model according to the lane-changing trajectory comprises:

determining the decision making model by taking a lane position 1 of the autonomous vehicle and a longitudinal displacement s of the autonomous vehicle as a system state and a system output and by taking a lane-changing time T, a longitudinal velocity $v_x$, and a lane ID lc of a selected lane as input, and wherein the decision making model satisfies that:

$\dot{x}=A_c x+B_c,$ $y=C_c x$ wherein $$A_c = \begin{bmatrix} 0 & 0 \\ 0 & -\frac{1}{T} \end{bmatrix}; B_c = \begin{bmatrix} 1 & 0 \\ 0 & 1 \end{bmatrix}; C_c = \begin{bmatrix} 1 & 0 \\ 0 & \frac{1}{T} \end{bmatrix}; x = \begin{bmatrix} s \\ l \end{bmatrix}; u = \begin{bmatrix} v_x \\ lc \end{bmatrix};$$

and y denotes the system output.

2. The method of claim 1, wherein screening out the obstacle comprises:

obtaining information of the at least one obstacle through one or a combination of the following devices:

a camera mounted on the autonomous vehicle;

a radar mounted on the autonomous vehicle; and a map mounted on the autonomous vehicle.

3. The method of claim 2, wherein the information of the at least one obstacle comprises:

at least one of an obstacle O(n,p) in a front direction or an obstacle O(n,p) in a rear direction in each lane of $n_l$ lanes extending in a same direction as a heading direction of the autonomous vehicle, wherein the O(n,p) comprises a longitudinal distance D(n,p) in a lane direction, a relative velocity V(n,p), and an absolute acceleration a(n,p);

n denotes a lane identifier (ID) of each lane of the $n_l$ lanes, and is an integer from 1 to $n_l$; and p denotes a relative position of the obstacle, and is equal to f or r, wherein f denotes an obstacle in the front direction, and r denotes an obstacle in the rear direction, $n_l$ denotes a number of lanes; and wherein screening out the at least one obstacle comprises:
screening out a closest obstacle in the front direction and a closest obstacle in the rear direction according to the following equations:

$$N(n, f) = \min_j D(j) \quad 1_j = n, D(j) \geq 0$$
$$N(n, r) = \max_j D(j) \quad 1_j = n, D(j) < 0,$$

wherein j denotes an obstacle ID, D (j) denotes a longitudinal distance of an obstacle, N denotes an obstacle ID of a screened-out obstacle, and $l_j$ denotes a lane ID of a lane to which the obstacle belongs, and wherein the lane ID $l_j$ of the lane to which the obstacle belongs is determined according to the following equation:

$$l_n = \begin{cases} n & f_{nll}(X(n, p)) \leq Y(n, p) < f_{nll+1}(X(n, p)) \\ \text{other} & \text{other} \end{cases},$$

wherein
X(n,p) denotes a longitudinal distance of the obstacle;
Y(n,p) denotes a lateral distance of the obstacle;
$f_{nll}(X(n,p))$ denotes a lateral position of a lane line at a position with a longitudinal distance of X(n,p); and
$n_u$ denotes a lane ID of a lane line left to the obstacle, and ranges from 1 to $n_l$ in an ascending order from left to right.

4. The method of claim 1, wherein planning the lane-changing trajectory according to the obstacle comprises:
determining, according to the following equation, a lateral reference trajectory during that the autonomous vehicle is changing a lane:

$$Y(t) = \int_0^t v(t)dt,$$

wherein Y(t) denotes a displacement curve, v(t) denotes a velocity curve, t denotes time, and v(t) is determined according to the following equation:

$$v(t) = \int_0^t a(t)dt,$$

wherein a(t) denotes a function of acceleration of the autonomous vehicle against the time.

5. The method of claim 4, wherein the function a(t) of the acceleration of the autonomous vehicle against the time is determined according to the following equation:

$$a(t) = \begin{cases} a_{max} t & 0 \leq t < t_1 \\ J_{max} & t_1 \leq t < t_2 \\ -J_{max} \frac{t - t_2}{t_3 - t_2} + J_{max} & t_2 \leq t < t_3 \\ -J_{max} \frac{t - t_3}{t_4 - t_3} & t_3 \leq t < t_4 \\ -J_{max} & t_4 \leq t < t_5 \\ J_{max} \frac{t - t_5}{t_6 - t_5} - J_{max} & t_5 \leq t < t_6 \end{cases},$$

wherein $J_{max}$ denotes an acceleration rate, and $a_{max}$ denotes a maximum lateral acceleration;
$t_1$ denotes a positive rise time of a(t), $t_2$ denotes a positive hold time of a(t), $t_3$ denotes a positive fall time of a(t), $t_4$ denotes a negative fall time of a(t), $t_5$ denotes a negative hold time of a(t), and $t_6$ denotes a negative rise time of a(t), wherein, the positive rise refers to that the acceleration is larger than 0 and increased, the positive hold refers to that the acceleration is larger than 0 and remains unchanged, the positive fall refers to that the acceleration is larger than 0 and decreased, the negative fall refers to that the acceleration is smaller than 0 and decreased, the negative hold refers to that the acceleration is smaller than 0 and remains unchanged, and the negative rise refers to that the acceleration is smaller than 0 and increased; and $t_2$, $t_3$, $t_4$, $t_5$, and $t_6$ are determined according to the following equations:

$$\begin{cases} t_1 = \frac{1}{1 + k_l} \frac{t_l}{2} \\ t_2 = \frac{k_l}{1 + k_l} \frac{t_l}{2} \\ t_3 = t_1 + t_2 \\ t_4 = 2t_1 + t_2 \\ t_5 = t_1 + 2t_2 \\ t_6 = 2t_1 + 2t_2 \end{cases},$$

wherein $t_l$ denotes a lane-changing time, and $k_l = t_2 : t_1$; and $t_1$ and $t_2$ are determined according to the following equations:

$$\begin{cases} t_1 = \frac{a_{max}}{J_{max}} \\ t_2 = -\frac{t_1}{2} + \frac{1}{2}\sqrt{t_1^2 + \frac{4d}{t_1 J_{max}}} \end{cases},$$

wherein d denotes a lane width; and
$a_{max}$ and $J_{max}$ are determined according to the following equations:

$$\begin{cases} a_{max} = \frac{4d(1 + k_l)}{t_l^2 k_l} \\ J_{max} = \frac{8d(1 + k_l)^2}{t_l^3 k_l} \end{cases}.$$

6. The method of claim 1, wherein,
the lane position l is determined according to a lane ID $n_u$ of a lane line left to the obstacle, a lateral displacement $y_l$ from the autonomous vehicle to the lane line left to the host autonomous vehicle and a lane width d, and wherein
the lane position l is determined according to the following equation:

$$l = n_{ll} + \frac{y_l}{d} - \frac{1}{2}.$$

7. The method of claim 1, wherein controlling the autonomous vehicle by designing the longitudinal and lateral integrated moving horizon decision making controller according to the decision making model, comprises:
discretizing the decision making model;
deriving a prediction equation;
constructing a decision making objective function according to a collision avoidance objective function, a maintaining desired velocity objective function, an objective function for reducing lane changes, and an objective function for reducing lane changing action changes;
determining an optimal decision making according to the prediction equation and an optimization problem; and
controlling the autonomous vehicle according to the optimal decision making,
wherein optimal control variables comprise: an optimal velocity, an optimal lane ID, and optimal lane-changing time.

8. The method of claim 7, wherein the discretized decision making model satisfies that:

$$x(k+1)=Ax(k)+Bu(k)$$

$$y(k)=Cx(k),$$

wherein $A=e^{A_cT_s}$, $B=\int_0^{T_s}e^{A_cT_s}dtB_c$, $C=C_c$, $T_s$ denotes discrete time;

$$C_c = \begin{bmatrix} 1 & 0 \\ 0 & \frac{1}{T} \end{bmatrix},$$

and T denotes lane-changing time;
wherein the prediction equation satisfies that:

$$\begin{cases} y(k+1) = CAx(k) + CBu(k) \\ \vdots \\ y(k+N) = CA^Nx(k) + CA^{N-1}Bu(k) + \ldots + CBu(k+N-1) \\ \vdots \\ y(k+P) = CA^Px(k) + CA^{P-1}Bu(k) + \ldots + \sum_{k=1}^{P-N+1} CA^{i-1}Bu(k+N-1) \end{cases},$$

P denotes a prediction horizon, and N denotes a control horizon, and
wherein the collision avoidance objective function satisfies that:
$J_1=-\Sigma_{i=1}^P\|TTC_f\|^2+\|TTC_r\|^2$, $TTC_f$ denotes time of collision between the autonomous vehicle and a closest obstacle in a front direction, and $TTC_r$ denotes time of collision between the autonomous vehicle and a closest obstacle in a rear direction.

9. The method of claim 7, wherein a desired velocity is maintained by the autonomous vehicle, and the desired velocity is a preset vehicle driving velocity,
wherein $$J_2 = \sum_{i=1}^N \|\Delta v_x\|^2, \Delta v_x = v_{ref} - v_x, v_{ref}$$

denotes the desired velocity, $v_x$ denotes the longitudinal velocity, and N denotes a control horizon; and wherein an objective function of reducing the lane changing action changes satisfies that:

$$J_4 = \sum_{i=1}^N \|\Delta lc\|^2,$$

$\Delta lc=lc(i)-lc(i-1)$, lc denotes the lane ID of the selected lane, and $\Delta lc$ denotes a lane changing action change.

10. A longitudinal and lateral integrated moving horizon decision making apparatus for an autonomous vehicle in a snowy and icy environment based on trajectory prediction, comprising:
a memory, a processor and a user interface, wherein:
the memory is configured to store a computer program;
the user interface is configured to interact with a user; and
the processor is configured to read the computer program in the memory, and execute the computer program to implement:
screening out an obstacle;
planning a lane-changing trajectory according to the obstacle;
establishing a decision making model according to the lane-changing trajectory; and
controlling the autonomous vehicle by designing a longitudinal and lateral integrated moving horizon decision making controller according to the decision making model;
wherein establishing the decision making model according to the lane-changing trajectory comprises:
determining the decision making model by taking a lane position l of the autonomous vehicle and a longitudinal displacement s of the autonomous vehicle as a system state and a system output and by taking a lane-changing time T, a longitudinal velocity $v_x$, and a lane ID lc of a selected lane as input, and wherein the decision making model satisfies that:

$$\dot{x}=A_cx+B_c,$$

$$y=C_cx$$

wherein $$A_c = \begin{bmatrix} 0 & 0 \\ 0 & -\frac{1}{T} \end{bmatrix}; B_c = \begin{bmatrix} 1 & 0 \\ 0 & 1 \end{bmatrix}; C_c = \begin{bmatrix} 1 & 0 \\ 0 & \frac{1}{T} \end{bmatrix}; x = \begin{bmatrix} s \\ l \end{bmatrix}; u = \begin{bmatrix} v_x \\ lc \end{bmatrix};$$

and
y denotes the system output.

* * * * *